May 3, 1949.　　　　S. RZEPELA　　　　2,469,313
ECCENTRIC DRIVE GEAR MECHANISM
Filed Sept. 27, 1948
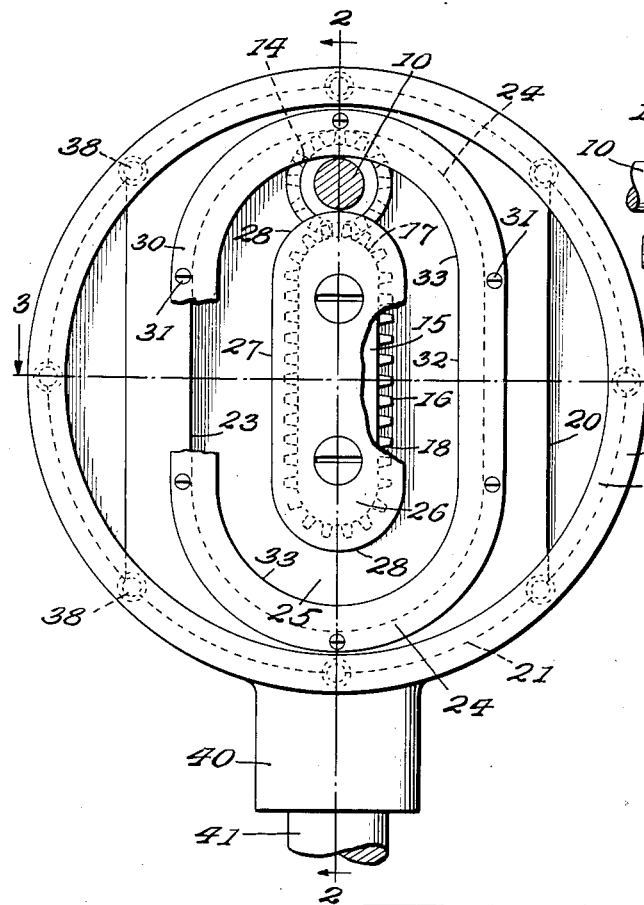
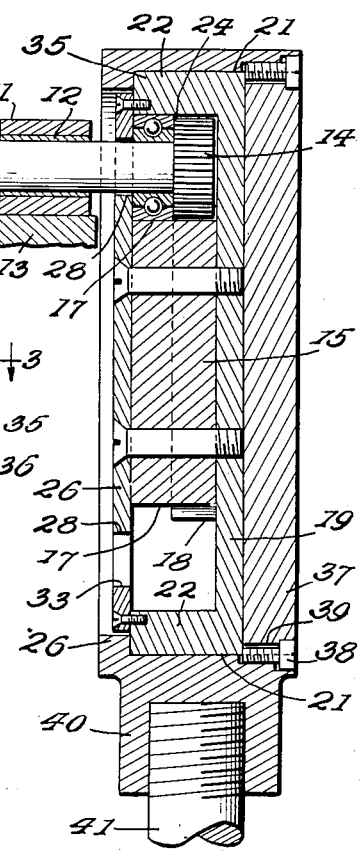
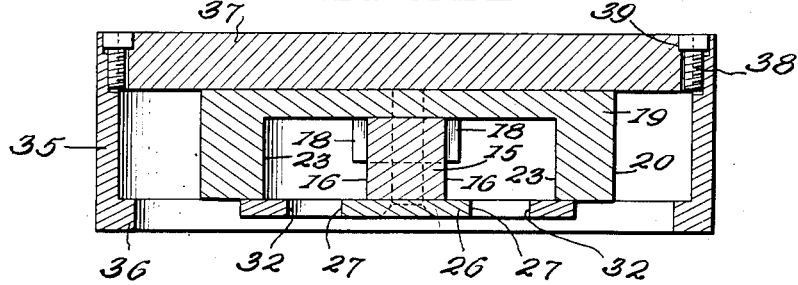
INVENTOR.
Stanley Rzepela,
BY Bryant & Lowry
attys.

Patented May 3, 1949

2,469,313

UNITED STATES PATENT OFFICE 2,469,313

ECCENTRIC DRIVE GEAR MECHANISM

Stanley Rzepela, Philadelphia, Pa.

Application September 27, 1948, Serial No. 51,413

6 Claims. (Cl. 74—30)

This invention relates to an eccentric drive mechanism and has special reference to a device of this character adapted for use in connection with connecting rods and the like.

Furthermore, the invention relates to a mechanical movement for converting rotary motion to oscillating and reciprocating motion.

One important object of the invention is to provide an improved construction of a device of this class embodying a rotary gear meshing with a band-like rack.

Another important object of the invention is to provide a structure for the purpose set forth having novel means for holding a rotary gear in constant engagement with a band-like rack.

A further important object of the invention is to provide a novel anti-frictional means associated with the means for holding the gear and rack in engagement.

A still further object of the invention is to provide a novel construction of a device of this class wherein there is embodied means for varying the extent of reciprocatory movement of the driven portion of the device which includes the rack.

With the above and other objects in view, as will be presently apparent, the invention consists in general of certain novel details of construction and combinations of parts hereinafter fully described, illustrated in the accompanying drawing, and particularly claimed.

In the drawings:

Figure 1 is a side elevation of the invention with certain portions broken away to better disclose the structure, Figure 2 is a section on the line 2—2 of Figure 1, and Figure 3 is a section on the line 3—3 of Figure 1.

The invention embodies a driving means and a driven means or head. In the driving means, as here shown, there is provided a shaft 10 journaled in a bearing 11 having an anti-friction lining 12. This bearing is mounted on a fixed structure a portion of which is shown at 13. The shaft is driven by any suitable means as, for instance, it may form the shaft of a windmill or other prime motor. The shaft 10 projects well through the bearing and carries on its end a gear 14.

The head includes an elongated member 15 having parallel flat sides 16 and rounded ends 17. Projecting from the sides 16 and ends 17 are gear teeth 18 so that there is thus formed a belt-like rack. The teeth 18 do not extend the full width of the member 15 but only for about one-half such width and the rack thus formed is then equal in width to the gear 14 which meshes with said rack. This leaves portions of the sides 16 and ends 17 blank for purposes presently to be explained. At 19 is a plate which rests against the member 15. The plate 19 has parallel flat sides 20 and arcuate ends 21 the arcs of which have a common center mid-length the longitudinal axis of the member 15 so that the ends 21 are arcs of the same circle. The plate 19 has a peripheral flange 22 shaped to provide a receptacle for the member 15 and having sides 23 parallel to the sides 16 and ends 24 concentric to the ends 17 so that a channel 25 is formed around the member 15 and this channel is of uniform width throughout. Mounted on the member 15 is a plate 26 having straight parallel edges 27 and arcuate ends 28 concentric to the ends 17. The lateral and longitudinal dimensions of this plate are such that the periphery of the plate overhangs the channel 25. The members 26, 15 and 19 are held together by screws 29 countersunk in the plate 26 and threaded into the plate 19. Similarly a strap 30 is secured to the flange 22 by screws 31, this strap having straight inner edges 32 parallel to the edges 27 and arcuate inner edges 33 concentric with the edges 28.

The arrangement of the parts 26 and 30 thus provides a slot for the reception of the shaft 10 and this slot is greater in width than the diameter of the shaft so that the shaft can revolve without frictionally engaging either the plate 26 or strap 30. It will be seen from the drawings that the inner edge portion of the strap 30 overhangs the channel 25. Mounted on the shaft 10 between the gear 14 and the overhanging portions of the members 26 and 30 is a ball bearing 34 which thus lies in the channel 23 and acts to center the shaft 10 in the slot between the members 30 and also holds the gear 14 constantly in proper mesh with the teeth 18.

An eccentric strap 35 is mounted on the arcuate peripheral portions of the plate 19 and its flange 22. This strap 35 has an inwardly projecting flange 36 which overlaps the arcuate peripheral portions of the flange 22. The plate 19 and the attached members 15, 26 and 30 is thus revoluble in the eccentric strap. Resting on the rear face of the plate 19 is a cover plate 37 which is secured to the eccentric straps by machine screws 38. A preferable manner of fitting these screws in place is to drill spaced holes at the junction of the cover plate 37 and the eccentric strap 35. These holes are then tapped but the portions of the threads which are formed in the cover plate 37 are cut-out as at 38. The heads of these screws lap into countersunk portions 39 of the screw holes so that tightening of the screws 38, the plate 19 and its flange are clamped against rotation between the flange 36 and cover plate 37. Projecting radially from the eccentric strap is a boss 40 in which is screwed or otherwise secured a pitman or connecting rod, a portion of which is shown at 41.

In operation revolution of the shaft 10 in the position shown in Figures 1 and 2 causes the head to oscillate slightly by action of the gear 14 on the upper arcuate strap-like rack portion. As the rotation of the gear 14 continues the straight rack portion at one side is caused to travel upwardly in a straight line until the lower arcuate portion of the rack reaches the gear which effects oscillation opposite to that first caused and movement of the head downwardly.

By loosening the screws 38 and adjusting the parts within the eccentric strap and again tightening said bolts, the extent of reciprocal movement may be adjusted, the screws being again tightened to hold the parts in adjusted position.

It is to be noted that the plate 19 with its flange 20 is a cup-like structure having an elongated recess which holds the rack member 15.

What is claimed, is:

1. In a device of the kind described, the combination with a driving gear, of a head including a cup-like body member having an elongated recess centrally disposed therein, an elongated rack-carrying member fixed centrally in said recess, said gear being located between the rack-carrying member and the side of said recess, an eccentric strap surrounding said body member and rotatable with respect thereto for angular adjustment of the rack-carrying member with respect to the gear, and means to secure the eccentric strap in adjusted position.

2. In a device of the kind described, the combination with a driving gear, of a head including a cup-like body member having an elongated recess centrally disposed therein, an elongated rack-carrying member fixed centrally in said recess, said gear being located between the rack-carrying member and the side of said recess, an eccentric strap surrounding said body member and rotatable with respect thereto for angular adjustment of the rack-carrying member with respect to the gear, said eccentric strap having an internal flange at one side against which the open side of the body member engages, a cover plate on the opposite side of the body member, and clamping screws engaging in said eccentric strap and having heads bearing against the edge portion of the cover plate.

3. In a device of the kind described, the combination with a driving gear, of a head including a cup-like body member having an elongated recess centrally disposed therein, an elongated rack-carrying member fixed centrally in said recess, said gear being located between the rack-carrying member and the side of said recess, an eccentric strap surrounding said body member and rotatable with respect thereto for angular adjustment of the rack-carrying member with respect to the gear, means to secure the eccentric strap in adjusted position, and guard members carried by said rack-carrying member and body member and overhanging the space between said rack-carrying and body members.

4. In a device of the kind described, the combination with a driving gear, of a head including a cup-like body member having an elongated recess centrally disposed therein, an elongated rack-carrying member fixed centrally in said recess, said gear being located between the rack-carrying member and the side of said recess, an eccentric strap surrounding said body member and rotatable with respect thereto for angular adjustment of the rack-carrying member with respect to the gear, said eccentric strap having an internal flange at one side against which the open side of the body member engages, a cover plate on the opposite side of the body member, clamping screws engaging in said eccentric strap and having heads bearing against the edge portion of the cover plate, and guard members carried by said rack-carrying member and body member and overhanging the space between said rack-carrying and body members.

5. In a device of the kind described, the combination with a driving gear, of a head including a cup-like body member having an elongated recess centrally disposed therein, an elongated rack-carrying member fixed centrally in said recess, said gear being located between the rack-carrying member and the side of said recess, an eccentric strap surrounding said body member and rotatable with respect thereto for angular adjustment of the rack-carrying member with respect ot the gear, means to secure the eccentric strap in adjusted position, guard members carried by said rack-carrying member and body member and overhanging the space between said rack-carrying and body members, a shaft carrying said gear and extending between said guard members, and an anti-friction bearing on said shaft between said gear and guard members.

6. In a device of the kind described, the combination with a driving gear, of a head including a cup-like body member having an elongated recess centrally disposed therein, an elongated rack-carrying member fixed centrally in said recess, said gear being located between the rack-carrying member and the side of said recess, an eccentric strap surrounding said body member and rotatable with respect thereto for angular adjustment of the rack-carrying member with respect to the gear, said eccentric strap having an internal flange at one side against which the open side of the body member engages, a cover plate on the opposite side of the body member, clamping screws engaging in said eccentric strap and having heads bearing against the edge portion of the cover plate, guard members carried by said rack-carrying member and body member and overhanging the space between said rack-carrying and body members, a shaft carrying said gear and extending between said guard members, and an anti-friction bearing on said shaft between said gear and guard members.

STANLEY RZEPELA.

No references cited.